UNITED STATES PATENT OFFICE.

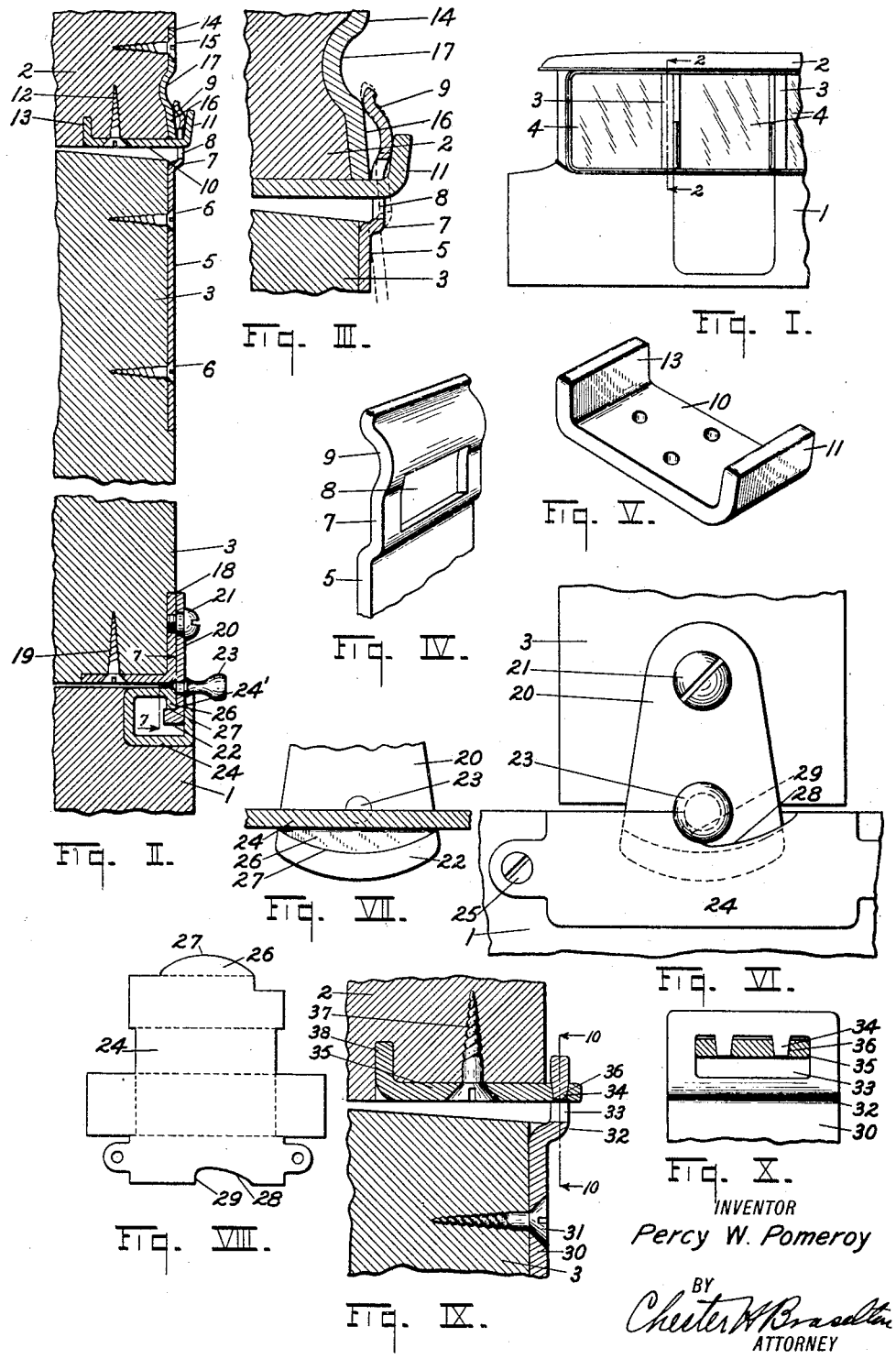

PERCY W. POMEROY, OF TOLEDO, OHIO, ASSIGNOR TO THE WILLYS-OVERLAND COMPANY, OF TOLEDO, OHIO.

VEHICLE-BODY.

1,376,460.   Specification of Letters Patent.   Patented May 3, 1921.

Application filed April 9, 1917. Serial No. 160,704.

*To all whom it may concern:*

Be it known that I, PERCY W. POMEROY, a citizen of the United States, residing at Toledo, county of Lucas, State of Ohio, have invented new and useful Improvements in Vehicle-Bodies, of which the following is a specification.

This invention relates to convertible bodies for motor vehicles, and more particularly to the engaging connections and separable locking means for the demountable pillars therefor whereby a novel combination of vehicle body and attachable and detachable window and door pillars is provided.

The principal object of this invention is to produce a novel combination of convertible vehicle body with detachable window and door pillars of the character indicated providing a separable engaging connection and locking means for demountable or detachable pillars, of such a nature as to secure the same under tension. Another object is to provide separable engaging and locking means whereby the pillar may be secured to the body and the permanent top quickly, and said pillar held under tension against both vertical and horizontal movement. Another object is to provide an engaging connection whereby the pillar may be positioned in relation to the top without adjusting the same to any particular angle or position for securing the same.

Further objects, and objects relating to economies of manufacture and details of construction will definitely appear in the detailed description to follow.

I accomplish the objects of my invention by the device and means described in the following specification. My invention is clearly defined and pointed out in the appended claims.

A structure constituting a preferred embodiment of my invention is illustrated in the accompanying drawing, forming a part of this specification, in which:

Figure 1 is a fragmentary side elevation of a motor vehicle, in which a preferred form of my invention is embodied;

Fig. 2 is an enlarged fragmentary sectional view taken substantially on line 2—2 of Fig. 1, showing engaging connection and locking means at the ends of the pillar;

Fig. 3 is an enlarged sectional view, similar to the upper portion of Fig. 2, showing in dotted lines the pillar and connecting parts before it is placed under tension;

Fig. 4 is a perspective view of the resilient tongue portion of the engaging connection;

Fig. 5 is a perspective view of the catch or receiving portion of the engaging connection;

Fig. 6 is a front elevation, showing the latch and keeper of the locking means;

Fig. 7 is a detailed sectional view, taken on line 7—7 of Fig. 2;

Fig. 8 is a blank of the keeper;

Fig. 9 is a sectional view, showing a modified form of the engaging connection; and Fig. 10 is a sectional view, taken on line 10—10 of Fig. 9, the engaging member being in full lines.

In the drawings similar reference characters refer to similar parts throughout the several views, and the sectional views are taken looking in the direction of the little arrows at the end of the section lines.

Considering the parts of the drawings; 1 represents the body of a motor vehicle, and 2 the permanent top. The removable or demountable pillars 3 are detachably connected at their ends to the body 1 and the permanent top 2 respectively, and said pillars serve as guides for the edges of the windows 4, as shown in Fig. 1. When it is desired to convert the vehicle, shown in Fig. 1, into a vehicle of the open type, the windows 4 are lowered into the body and the pillars are disconnected from the top and body respectively, and are entirely removed.

A plate 5 is secured to the upper end of the demountable pillar by screws 6, and has an offset portion 7 extending from the upper end thereof. The offset portion 7 is provided with a slotted opening 8 and a curved portion 9, the upper end portion of the plate 5 being slightly resilient. (See particularly Figs. 3 and 4). The offset portion 7, of the plate 5, is adapted to be slipped over a catch 10, and held in position by the upturned edge 11 of the catch 10. (Figs. 2 and 3). The catch 10 is secured to the lower edge of the permanent top 2 and is held securely in position by screws 12 and an upturned edge 13. A plate 14 is secured by screws 15 to the inner edge of the permanent top 2. The lower end 16 of the plate 14 is set at a slight angle to the face of the plate, and this with the upturned edge 11 of the catch 10 forms a pocket to receive the curved portion 9 of the plate 5, the plate 5 supporting the demountable pillar, as before described. The plate 14 also has a curved or recessed portion 17, so arranged that when it is desired to remove the demountable pillar, the curved portion 9 of the plate 5 may slide into the curved portion 17 of the plate 14 and the plate 5 may be released or removed from the catch 10. It will be seen that the inclined end 16 of the plate 14, and the upturned end 11 of the catch 10 are inclined in opposite directions to form a wedge shaped seat, and as the demountable pillar 3 is drawn into position, the curved portion 9 of the plate 5 will be drawn and wedged between these parts just described, and the pillar will be held securely against both vertical and horizontal movement.

An angle bracket 18 is secured to the inner face and the under side of the demountable pillar 3 by screws 19. A latch or locking member 20 is pivoted at 21 to the angle bracket 18. The latch 20 at its lower end has a curved flange 22 which coöperates with the keeper 24, to be hereinafter described. To facilitate the operation of the latch or locking member 20, I provide a handle 23, A keeper member 24 is secured to the body of the vehicle by screws 25. (See Fig. 6.) The keeper 24 has a depending flange 26, the same having a curved surface 27 adapted to be engaged with the coinciding upper curved edge of the flange 22 of the latch 20. (See Fig. 7.) The curved edge 27 of the keeper 24 is the arc of a circle eccentric to the pivot point 21, so that when the latch 20 is brought into locking position, the demountable pillar 3 is drawn into closer engagement with the body 1. The outer surface of the keeper 24 is cut away as at 28 to allow for the swing of the handle 23, and has a stop 29 for said handle to abut against A guideway 24' is formed between the outer surface of the depending flange 26 and inner side of the front face of the keeper 24 to receive the latch 20 when it is brought into locking engagement. Thus it will be seen that as the pillar is pushed outwardly and the latch 20 is entered in the guideway 24' and is drawn into engagement, the handle 23 contacts with the stop 29, and the parts will all be held against movement.

To place the pillar in operative position, the offset end of the plate 5 is slipped over the upturned edge 11 of the catch 10, at which time the demountable pillar 3 will be suspended loosely from the top 2. The pillar is then moved outwardly so that the latch may move in the keeper 24. As the latch 20 is drawn into locking position, the curved portion 9 of the plate 5 at the upper end of the pillar 3 will be drawn into the wedge shaped seat formed by the inclined surfaces 11 and 16, and the pillar will be drawn downwardly as the flange 22 of latch 20 is drawn into locking position under the eccentric surface 27 of the keeper member 24. It will thus be seen that as the demountable or removable pillar 3 is drawn downwardly and outwardly, the engaging parts at the top of the pillar will be drawn and wedged together thus seating the curved portion 9 of the plate 5 between the inclined edge 16 of the plate 14 and the upturned end 11 of the catch 10, and held firmly by friction in the wedge shaped seat formed by the inclined surfaces. To remove the pillar after releasing the latch the pillar may be lifted and swung in a short distance, at which time it may be lifted free from the top and become entirely disconnected from the vehicle.

It will be noted that the locking member and the engaging member are both secured to the pillar, and there are few parts exposed when the vehicle is converted into the open type. By this arrangement the upholstery can be closely fitted around both the body and the top giving a neat and pleasing appearance.

While I have found it desirable to construct my device in the form shown, the upturned end of the catch 10 may be formed integral with the plate 14 instead of on the separate plate 10 and form the same wedge shaped seat without the use of the plate 10. If desired, the engaging means may be transposed, and the parts forming the wedge shaped seat may be secured to the pillar and the plate 5 secured to the top. The locking means may also be transposed, the latch being secured to the body and the keeper secured to the pillar. Also, if it is found desirable, the locking and engaging means may be reversed, the locking means being at the top of the pillar and the engaging means at the bottom.

In Figs. 9 and 10 I have shown a modified form of engaging means, in which a plate 30 is secured to the demountable pillar 3 by screws 31, the upper end of the plate having an offset portion 32. The offset portion 32 of the plate 30 has a slotted opening 33 and depending lugs 34 extending therein. The lugs 34 are adapted to engage in corresponding openings 36 in a plate 35, the plate 35 being rigidly secured to the under side of the top 2 by screws 37 and the upturned edge 38 of the plate 35. In this modified structure to remove the pillar, the lugs 34 are brought out of engagement with their corresponding openings 36 and the pillar entirely removed.

I am aware that the embodiment of my invention herein shown and described is susceptible of considerable variation, both in the form of the engaging means and the locking mechanism, without departing from the spirit and scope thereof, and therefore, I desire to claim the same broadly as indicated in the appended claims.

I have found, however, that this particular embodiment, from many stand-points, is desirable, and therefore, I desire to claim the same specifically as well as broadly, as will appear from the appended claims.

Having thus described my invention, what I claim as new and desire to secure by Letters Patent is:

1. In a vehicle body provided with a top, the combination of removable door and window pillars; engaging means for the upper end of each pillar, comprising an engaging member having a curved portion, said engaging means being secured to said pillar; a catch having an upturned end, said catch being secured to said top; a plate secured to said top; and means for interlocking the bottom of each pillar so that the curved portion of said engaging member is drawn firmly between the said plate and the upturned end of said catch.

2. In a vehicle body provided with a top, the combination of removable door and window pillars; engaging means for the upper end of each pillar, comprising an engaging member having a slotted opening and a curved portion, said engaging member being secured to said pillar; a catch having an upturned end, said catch being secured to said top; a plate secured to said top; and means for interlocking the bottom of each pillar with the body and moving the pillar so that the engaging member is drawn firmly between said plate and the upturned end of said catch.

3. In a vehicle body provided with a top, the combination of removable door and window pillars; engaging means for the upper end of each pillar, comprising an engaging member having a curved extension and a slotted opening; a catch having an upturned end which is adapted to project through said opening; a plate having an inclined surface at its lower end and a curve in its face, the curved extension of the engaging member being adapted to be held between said inclined surface and the upturned end of the catch, and the curve in the plate being provided to permit engagement and disengagement of the catch and engaging member; and means for interlocking the bottom of each post with the body and moving the pillar so that the engaging member is drawn firmly between said plate and the upturned end of said catch.

4. A vehicle body provided with a top in combination with a removable door or window pillar, securing means located between a part of the vehicle top and the top part of the pillar including a wedge shaped seat on one of said parts, and a wedge secured to the other of said parts and adapted to be drawn into said wedge shaped seat to hold the upper end of the pillar against movement when the bottom of the pillar is secured to the body and means for securing the bottom of the pillar to the body.

5. In a vehicle body provided with a top, the combination therewith of a removable door or window pillar, securing means located between the top and the top part of the pillar including a wedge shaped seat having a projection, coacting means therefor having a slot adapted to receive said projection and a wedge portion adapted to be firmly seated in said wedge shaped seat, and means for securing the bottom of the pillar to the body.

6. In a vehicle body provided with a top, the combination of removable door and window pillars; securing means fast to the top having a projection, a wedge shaped seat and a curved portion; an engaging member having a slot adapted to receive said projection and having a curved portion adapted to be firmly seated in said wedge shaped seat when the bottom of the pillar is secured to the body, the end of said engaging means being adapted to move in the said curved portion of the securing means to permit attachment of the top of said pillar to said top; and means for securing the bottom of the pillar to the body.

7. In a vehicle body provided with a top, the combination therewith of removable door and window pillars, separable fastening means for securing the top of each pillar to the top and locking means for securing the bottom of each pillar to the body, said fastening means being so constructed and arranged as to permit the pillars to be placed in operative position and removed therefrom while being maintained substantially vertical, said locking means comprising a member mounted on the bottom of the pillar and a member mounted on the body, one member being a pivoted latch and the other a keeper so constructed that, when the latch is swung to locking position, the pillar is drawn down and detachably secured under tension in position in said vehicle body.

8. In a vehicle body provided with a top, the combination therewith of removable door and window pillars, separable fastening means for securing the top of each pillar to the top, and locking means for securing the bottom of each pillar to the body, said fastening and locking means being so constructed and arranged as to permit the pillar to be placed in operative position and removed therefrom while being maintained substantially vertical, said locking means comprising a pivoted latch on the bottom of the pillar and a plate fast to the body, said plate having a pair of flanges forming a guideway for the latch, one of said flanges coöperating with the latch to draw the pillar down and retain the latch in locking position, and both flanges coöperating with the latch to prevent lateral movement of the pillar in two directions.

9. In a vehicle body provided with a top, the combination of removable door and window pillars, each of which is laterally removable while in a substantially vertical position; means for securing the top of each pillar to the top; a latch pivoted to the bottom of each pillar and having a flange with a curved edge eccentric to the pivot of said latch; and a member fast to the body and adapted to coöperate with the eccentric edge of said latch to draw the pillar down and retain the latch in locking position; said member having a shoulder for limiting the movement of said latch.

10. In a vehicle body provided with a top, the combination of removable door and window pillars each of which is laterally removable while in a substantially vertical position; means for securing the top of each pillar to the top; a pivoted latch at the bottom of said pillar; a member secured to the body and so constructed that when the latch is swung to locking position the pillar is drawn down; and a shoulder on said member to limit the movement of said latch.

11. In a vehicle body provided with a body portion and a top portion, the combination therewith of a demountable pillar, attachable and detachable by a bodily lateral movement relative thereto while in a substantially vertical position, and means to secure said pillar in tensioned position between said body and top portions including an element of a separable fastener secured to said body portion and top portion, respectively, and a coöperating element secured to either end of said pillar.

12. In a device of the class described, a movable member, securing means therefor including a wedge shaped seat, one portion of which forms a projection, co-acting means therefor having a slot adapted to receive said projection, and a wedge portion carried by said coacting means and adapted to be positioned within said wedge shaped seat.

13. In a device of the class described, a securing means including a wedge shaped seat, one portion of which forms a projection, and co-acting means therefor having a slot adapted to receive said projection, the said means being provided with a curved portion bearing against the opposite edges of the wedge shaped seat.

In witness whereof I affix my signature.

PERCY W. POMEROY.

Correction in Letters Patent No. 1,376,460.

It is hereby certified that in Letters Patent No. 1,376,460, granted May 3, 1921, upon the application of Percy W. Pomeroy, of Toledo, Ohio, for an improvement in "Vehicle-Bodies," an error appears in the printed specification requiring correction as follows: Page 3, line 102, claim 7, before the word "means" insert the words *and locking;* and that the said Letters Patent should be read with this correction therein that the same may conform to the record of the case in the Patent Office.

Signed and sealed this 14th day of June, A. D., 1921.

[SEAL.]

WM. A. KINNAN,
*Acting Commissioner of Patents.*

Cl. 296—45.